United States Patent
Rappold

(10) Patent No.: US 12,523,669 B2
(45) Date of Patent: Jan. 13, 2026

(54) METHODS AND SYSTEMS FOR IMPROVED QUALITY ASSURANCE FOR HIGH-THROUGHPUT ANALYSIS

(71) Applicant: Laboratory Corporation of America Holdings, Burlington, NC (US)

(72) Inventor: Brian Alexander Rappold, Raleigh, NC (US)

(73) Assignee: Laboratory Corporation of America Holdings, Burlington, NC (US)

( * ) Notice: Subject to any disclaimer, the term of this patent is extended or adjusted under 35 U.S.C. 154(b) by 810 days.

(21) Appl. No.: 17/716,150

(22) Filed: Apr. 8, 2022

(65) Prior Publication Data

US 2022/0326266 A1 Oct. 13, 2022

Related U.S. Application Data

(60) Provisional application No. 63/173,001, filed on Apr. 9, 2021.

(51) Int. Cl.
G01N 35/00 (2006.01)

(52) U.S. Cl.
CPC .. *G01N 35/00732* (2013.01); *B01L 2300/021* (2013.01); *G01N 2035/00851* (2013.01)

(58) Field of Classification Search
CPC ... G01N 35/00732; G01N 2035/00851; G01N 2035/0418; G01N 35/00722; B01L 2300/021; B01L 9/56; B01L 2300/02; B01L 2300/0819; B01L 2300/0829
See application file for complete search history.

(56) References Cited

U.S. PATENT DOCUMENTS

| | | | |
|---|---|---|---|
| 9,082,600 B1 * | 7/2015 | Greving | B01L 3/5088 |
| 10,068,200 B1 * | 9/2018 | Greving | G06Q 10/087 |
| 2010/0279338 A1 * | 11/2010 | Halamish | B01L 9/56 |
| | | | 435/307.1 |

(Continued)

OTHER PUBLICATIONS

Canadian Patent Application No. 3,216,357 Office Action dated Nov. 29, 2024, 4 pages.

(Continued)

*Primary Examiner* — Jennifer Wecker
*Assistant Examiner* — Britney N. Washington
(74) *Attorney, Agent, or Firm* — Kilpatrick Townsend & Stockton LLP

(57) ABSTRACT

Disclosed are methods and systems for confirming the identification of samples processed by a high-throughput analytical technique. The method may include distributing a plurality of individual samples to individual predetermined positions of a multi-sample test unit and distributing an identifier material to at least one predetermined position of the multi-sample test unit. The method may also include determining the absence or presence of an analyte in the plurality of individual samples, and determining the presence of the identifier material, wherein the presence of the identifier material at the predetermined position of the multi-sample test unit is used to confirm the identity of the plurality of individual samples positioned in the multi-sample test unit. Also disclosed are systems for performing the methods. The methods and systems may be applied to high-throughput LC-MS/MS or other analytical methods.

15 Claims, 10 Drawing Sheets

(56) References Cited

U.S. PATENT DOCUMENTS

| | | | |
|---|---|---|---|
| 2011/0203924 A1* | 8/2011 | Wohlstadter | G01N 21/66 83/13 |
| 2014/0240096 A1* | 8/2014 | Johns | B01L 9/56 340/10.1 |
| 2018/0045641 A1* | 2/2018 | Zeder | G01N 35/028 |

OTHER PUBLICATIONS

PCT/US2022/023944, International Search Report and Written Opinion, Jul. 6, 2022, 12 pages.

Anderson, D. et al., "Validation of a fully automated robotic setup for preparation of whole blood samples for LC-MS toxicology analysis," *Journal of Analytical Toxicology*, 36(4):280-287 (2012).

Mbughuni, M. et al., "Mass spectrometry applications for toxicology," EJIFCC, 27(4):272-287 (2016).

Robb, DB. et al., "Atmospheric pressure photoionization: an ionization method for liquid chromatography-mass spectrometry," *Anal. Chem.* 72(15):3653-3659 (2000).

Sidqey, D. et al. "Quantitative Determination of Ethyl Glucuronide and Ethyl Sulfate in Postmortem and Antemortem Whole Blood Using Phospholipid Removal 96-Well Plate and UHPLC-MS-MS," Journal of Analytical Toxicology, 45:378-388 (2021).

Svanstrom, C. et al., "Development and validation of a method using supported liquid extraction for the simultaneous determination of midazolam and 1'-hydroxy-midazolam in human plasma by liquid chromatography with tandem mass spectrometry detection," *J. Pharm. Biomed. Anal.*, 58:71-77 (2012).

Viette, V. et al., "LC-MS (/MS) in clinical toxicology screening methods," *CHIMIA International Journal for Chemistry*, 66(5):339-342 (2012).

Wu, A. H., and French, D., "Implementation of liquid chromatography/mass spectrometry into the clinical laboratory," *Clinica Chimica Acta*, 420:4-10 (2013).

* cited by examiner

METHODS AND SYSTEMS FOR IMPROVED QUALITY ASSURANCE FOR HIGH-THROUGHPUT ANALYSIS

RELATED APPLICATIONS

This application claims priority to U.S. provisional patent application No. 63/173,001, filed Apr. 9, 2021. The disclosure of U.S. provisional patent application No. 63/173,001 is incorporated by reference in its entirety herein.

FIELD

The disclosure relates to methods and systems for improved quality assurance for high-throughput analysis.

BACKGROUND

High-throughput analysis of samples can be required in many clinical laboratories. To provide for such analysis, samples are often aliquoted into a grid format (e.g., 96-well plates or other grids) for subsequent purification and analytical steps. For example, liquid chromatography-tandem mass spectrometry (LC-MS/MS) in toxicology analysis has become common in many laboratories (Viette, V., Hochstrasser, D., & Fathi, M. (2012), "LC-MS (/MS) in clinical toxicology screening methods," *CHIMIA International Journal for Chemistry*, 66(5): 339-342; Mbughuni, M. M., Jannetto, P. J., & Langman, L. J. (2016), "Mass spectrometry applications for toxicology," *Ejifee*, 27(4): 272). As the technology has grown, challenges of volume have been addressed by multiplexing analytes as well as multiplexing chromatographic channels (Wu, A. H., & French, D. (2013), "Implementation of liquid chromatography/mass spectrometry into the clinical laboratory," *Clinica Chimica Acta*, 420, 4-10). Additionally, the adoption of 96-well plates is widespread, as evidenced by the number of sample preparation techniques available in a 96-well format. Solid-phase extraction, supported-liquid extraction, protein precipitation, phospholipid removal and ultra-filtration are all available in standardized 96-well sizes (Sidqey, D., Liane, V. H., & Kristoffersen, L. (2020), "Quantitative Determination of Ethyl Glucuronide and Ethyl Sulfate in Postmortem and Antemortem Whole Blood Using Phospholipid Removal 96-Well Plate and UHPLC-MS-MS" *Journal of Analytical Toxicology*, bkaa108, available on-line); Andersen, D Rasmussen, B., & Linnet, K. (2012), "Validation of a fully automated robotic setup for preparation of whole blood samples for LC-MS toxicology analysis," *Journal of Analytical Toxicology*, 36(4): 280-287; Svanström, C., Hansson, G. P., Svensson, L. D., & Sennbro, C. J. (2012), "Development and validation of a method using supported liquid extraction for the simultaneous determination of midazolam and 1'-hydroxy-midazolam in human plasma by liquid chromatography with tandem mass spectrometry detection. *Journal of Pharmaceutical and Biomedical Analysis*, 58:71-77). Many autosamplers are engineered to inject from and manipulate multiple plates on a single platform.

The 96-well plate format, and other grid formats, can suffer from a liability of quality assurance. Orientation, location and position errors associated with plate layout, plate storage of autosamplers and human error can occur. These errors may require extra documentation steps and/or can be difficult to prove (or account for) in laboratory practice. For example, plates can be moved without updating the sample analysis queue, reversed (turned 180 degrees), placed in an incorrect autosampler position or placed on the wrong instrument entirely. In some cases, these errors can be detected as gross outliers to expected plate contents. For example, a reversed plate containing calibrators which bracket the samples (e.g., positions 1-7 and 90-96) would have the calibrators injected the reverse order. However, not all concerns can be addressed by plate layout. Laboratories which calibrate daily (or less frequently) or maintain consistent plate layouts for quality control locations may still risk errors of incorrect sample acquisition. The plate location in the autosampler storage racks can be misassigned by the software, or the plate may be put into the wrong location. These errors have few specific mechanisms for identification. Thus, there is a need to develop methods and systems to reduce location errors in the analysis of samples positioned within a multisample grid.

SUMMARY

Disclosed herein are methods and systems to ensure positive identification for a multi-sample testing unit (e.g., a multi-well plate), starting from sample preparation and through data reduction, in an automated fashion. The disclosed approach provides a mechanism for unambiguous quality assurance in a high throughput laboratory. In certain embodiments, disclosed is a method for confirming the identification of samples processed by a high-throughput analytical technique, comprising: distributing a plurality of individual samples to individual predetermined positions of a multi-sample test unit; distributing an identifier material to at least one predetermined position of the multi-sample test unit; determining the absence or presence of an analyte in the plurality of individual samples; and determining the absence or presence of the identifier material, wherein the presence of the identifier material at the predetermined position of the multi-sample test unit is used to confirm the identity of the plurality of individual samples positioned in the multi-sample test unit. In certain embodiments, the method is used for high-throughput mass spectrometry (e.g., LC-MS/MS) analysis of samples. Also disclosed are systems for performing the disclosed methods or any of the steps of the disclosed methods. Also disclosed is a computer-program product tangibly embodied in a non-transitory machine-readable storage medium, including instructions configured to run the systems and/or perform a step or steps of the methods of any of the disclosed embodiments.

BRIEF DESCRIPTION OF THE FIGURES

The disclosure may be better understood by reference to the following non-limiting figures.

DETAILED DESCRIPTION

Figure 1:
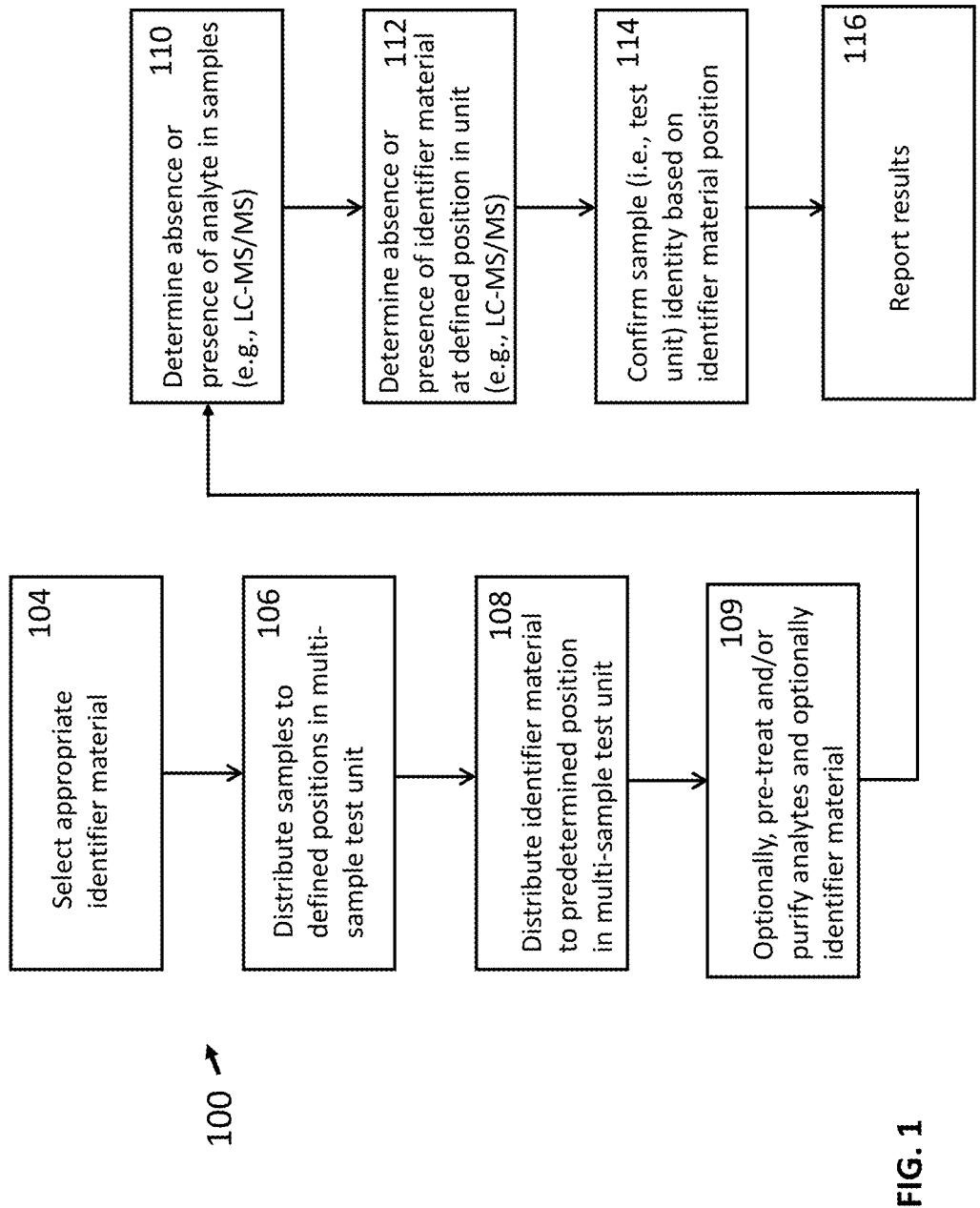
FIG. 1 schematically illustrates a method for incorporation of plate identifier material for high-throughput analysis of samples in accordance with an embodiment of the disclosure.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, method steps, or parts of a system, including circuits, systems, networks, processes, and other components may be shown as components in block diagram form in order not to obscure the embodiments in unnecessary detail.

Definitions

The present disclosure now will be described more fully hereinafter. The disclosure may be embodied in many different forms and should not be construed as limited to the aspects set forth herein; rather, these aspects are provided so that this disclosure will satisfy applicable legal requirements. Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in the patents, applications, published applications and other publications that are herein incorporated by reference, the definition set forth in this section or as used elsewhere herein prevails over the definition that is incorporated herein by reference.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements. It is understood that aspects and embodiments of the disclosure described herein include "consisting" and/or "consisting essentially of" aspects and embodiments.

The term "and/or," when used in a list of two or more items, means that any one of the listed items can be employed by itself or in combination with any one or more of the listed items. For example, the expression "A and/or B" is intended to mean either or both of A and B, i.e., A alone, B alone or A and B in combination. The expression "A, B and/or C" is intended to mean A alone, B alone, C alone, A and B in combination, A and C in combination, B and C in combination or A, B, and C in combination.

Various aspects of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range, such as from 1 to 6, should be considered to have specifically disclosed sub-ranges, such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

As used herein, when an action is "based on" something, this means the action is based at least in part on at least a part of the something.

"Sample," or "patient sample," or "biological sample," or "specimen" are used interchangeably herein. Samples may include upper and lower respiratory specimens. Such specimens (samples) may include nasopharyngeal or oropharyngeal swabs, sputum, lower respiratory tract aspirates, bronchoalveolar lavage, and nasopharyngeal washes/aspirates or nasal aspirates. Other non-limiting examples of samples include, a tissue sample (e.g., biopsies), blood or a blood product (e.g., serum, plasma, or the like), cell-free DNA, urine, a liquid biopsy sample, or combinations thereof. The term "blood" encompasses whole blood, blood product or any fraction of blood, such as serum, plasma, buffy coat, or the like, as conventionally defined. In some embodiments, the test sample is not a biological sample, but comprises a non-biological sample, e.g., obtained during the manufacture or laboratory analysis of a vitamin, which can be analyzed to determine the composition and/or yield of the manufacturing and/or analysis process.

As used herein, the term "subject" or "individual" refers to a human or any non-human animal. A subject or individual can be a patient, which refers to a human presenting to a medical provider for diagnosis or treatment of a disease, and in some cases, wherein the disease may be any infection by a pathogen. Also, as used herein, the terms "individual," "subject" or "patient" includes all warm-blooded animals.

As used herein, the term "identifier material," or "plate identifier material," or "identification material," or "plate identification material" refers to a compound (e.g., molecule) that is used to confirm the identity of a multi-sample test unit that is being evaluated based upon the position of the identifier material in a multi-sample test unit. The identifier material may be chemically similar to the analyte of interest (e.g., the same molecule but labeled with a different isotope, such as deuterium ("D" or "d") in place of hydrogen). The identifier material may be the same as a stably labeled isotope that is used as an internal standard, or it may be differently labeled version of the internal standard (e.g., having additional deuterium ions or differently positioned deuterium atoms as compared to the internal standard). Or, the identifier material may be a completely different molecule than the analyte of interest and/or the internal standard.

As used herein, the term "multi-sample test unit" refers to a component that is used to analyze a plurality of samples in an assay. For example, a multi-sample test unit may be a 96-well plate. Or other types of grids (e.g., for accepting liquid or dried specimens) may be used. The multi-sample test unit may be 1-dimensional (as in a fluid flow aliquoting of multiple samples at designated times), 2-dimensional (such as a 96-well plate) or multidimensional (as in test units that include sampling via more than two dimensions).

As used herein, the terms "purify," or "separate," or derivations thereof do not necessarily refer to the removal of all materials other than the analyte(s) of interest from a sample matrix. Instead, in some embodiments, the terms "purify" or "separate" refer to a procedure that enriches the amount of one or more analytes of interest relative to one or more other components present in the sample matrix. In some embodiments, a "purification" or "separation" procedure can be used to remove one or more components of a sample that could interfere with the detection of the analyte, for example, one or more components that could interfere with detection of an analyte by mass spectrometry.

As used herein, "chromatography" refers to a process in which a chemical mixture carried by a liquid or gas is separated into components as a result of differential distribution of the chemical entities as they flow around or over a stationary liquid or solid phase.

As used herein, "liquid chromatography" (LC) means a process of selective retardation of one or more components of a fluid solution as the fluid uniformly percolates through a column of a finely divided substance, or through capillary passageways. The retardation results from the distribution of the components of the mixture between one or more stationary phases and the bulk fluid, (i.e., mobile phase), as this fluid moves relative to the stationary phase(s). "Liquid chromatography" includes reverse phase liquid chromatography (RPLC), high performance liquid chromatography (HPLC) and high turbulence liquid chromatography (HTLC). The chromatographic column typically includes a medium (i.e., a packing material) to facilitate separation of chemical moieties (i.e., fractionation). The medium may include minute particles. The particles may include a bonded surface that interacts with the various chemical moieties to facilitate separation of the chemical moieties, such as the biomarker analytes quantified in the experiments described herein. One suitable bonded surface is a hydrophobic bonded surface, such as an alkyl bonded surface. Alkyl bonded surfaces may include C-4, C-8, or C-18 bonded alkyl groups, preferably C-18 bonded groups. The chromatographic column includes an inlet port for receiving a sample and an outlet port for discharging an effluent that includes the fractionated sample. In an exemplary method, the sample (or pre-purified sample) may be applied to the column at the inlet port, eluted with a solvent or solvent mixture, and discharged at the outlet port. Different solvent modes may be selected for eluting different analytes of interest. For example, liquid chromatography may be performed using a gradient mode, an isocratic mode, or a polytyptic (i.e. mixed) mode.

As used herein, the term "HPLC" or "high performance liquid chromatography" refers to liquid chromatography in which the degree of separation is increased by forcing the mobile phase under pressure through a stationary phase, typically a densely packed column.

As used herein, the term "analytical column" refers to a chromatography column having sufficient chromatographic plates to effect a separation of the components of a test sample matrix. Preferably, the components eluted from the analytical column are separated in such a way to allow the presence or amount of an analyte(s) of interest to be determined. In some embodiments, the analytical column comprises particles having an average diameter of about 5 µm. In some embodiments, the analytical column is a functionalized silica or polymer-silica hybrid, or a polymeric particle, or monolithic silica stationary phase, such as a phenylhexyl functionalized analytical column.

Analytical columns can be distinguished from "extraction columns," which typically are used to separate or extract retained materials from non-retained materials to obtained a "purified" sample for further purification or analysis.

The terms "analyte," or "analyte of interest," or "measurand" may refer to the compound or molecule that is being measured by a high-throughput analytical technique. Such compounds may include hormones, peptides, cytokines or other biomolecules often present in subjects, or exogenously introduced compounds (e.g., in the context of drug testing), or molecules associated with disease (e.g., abnormal amounts of metabolites and the like).

The term "mass spectrometry" or "MS" is used to describe the analytical technique of measuring an analyte of interest by determining the mass-to-charge (m/z) ratio of ions derived from the analyte of interest. In MS, a sample, which may be solid, liquid, or gaseous, is ionized, for example, by bombarding it with electrons, thereby causing molecules to break up into positively charged fragments or simply become positively charged without fragmenting. Or, ionization to form negatively charged ions may be used. These ions (fragments) are then separated according to their mass-to-charge ratio, for example, by accelerating the ions and subjecting them to an electric or magnetic field, such that ions of the same mass-to-charge ratio will undergo the same amount of deflection. Results can be displayed as spectra of the signal intensity of detected ions as a function of the mass-to-charge ratio. The atoms or molecules in the sample can be identified by correlating a known mass (e.g. an entire molecule) to the detected mass or by a characteristic fragmentation pattern.

As used herein, "tandem mass spectrometry" or "MS/MS" involves generating a precursor ion (or parent ion) from a molecule of interest, which can be filtered in an MS instrument, such that the precursor ion is subsequently fragmented to yield one or more fragment ions (or daughter ions or product ions) that are then analyzed in a second MS procedure. By the selection of precursor ions, only ions produced by certain analytes are passed to the fragmentation chamber, where they collide with atoms of an inert gas to produce the fragment ions. The combination of filtration/fragmentation can be used to eliminate interfering substances, and can be particularly useful for the analysis of complex samples, such as biological samples.

The term "liquid chromatography-tandem mass spectrometry" or "LC-MS/MS" refers to liquid chromatography (often HPLC) that is coupled to MS/MS. In certain cases, coupling is on-line, such that no human intervention is required.

The terms "ionization" and "ionizing," as used herein, refer to the process of generating an analyte ion having a net electrical charge equal to one or more electron units. Negative ions are those ions having a net negative charge of one or more electron units, while positive ions are those ions having a net positive charge of one or more electron units.

The term "electron ionization," as used herein, refers to methods in which an analyte of interest in a gaseous or vapor phase interacts with a flow of electrons. Impact of the electrons with the analyte produces analyte ions, which may then be subjected to a mass spectrometry technique.

The term "chemical ionization," as used herein, refers to methods in which a reagent gas (e.g. ammonia) is subjected to electron impact, and analyte ions are formed by the interaction of reagent gas ions and analyte molecules.

The term "field desorption," as used herein, refers to methods in which a non-volatile test sample is placed on an ionization surface, and an intense electric field is used to generate analyte ions.

The term "matrix-assisted laser desorption ionization" or "MALDI," as used herein, refers to methods in which a non-volatile sample is exposed to laser irradiation, which desorbs and ionizes analytes in the sample by various ionization pathways, including photo-ionization, protonation, deprotonation, and cluster decay. For MALDI, the sample is mixed with an energy-absorbing matrix, which facilitates desorption of analyte molecules.

The term "surface enhanced laser desorption ionization" or "SELDI," as used herein, refers to another method in which a non-volatile sample is exposed to laser irradiation, which desorbs and ionizes analytes in the sample by various ionization pathways, including photo-ionization, protonation, deprotonation, and cluster decay. For SELDI, the sample is typically bound to a surface that preferentially retains one or more analytes of interest. As in MALDI, this process may also employ an energy-absorbing material to facilitate ionization.

The term "electrospray ionization" or "ESI," as used herein, refers to methods in which a solution is passed along a short length of a capillary tube, to the end of which is applied a high positive or negative electric potential. Upon reaching the end of the tube, the solution may be vaporized (nebulized) into a jet or spray of very small droplets of solution in solvent vapor. This mist of droplet can flow through an evaporation chamber, which is heated slightly to prevent condensation and to evaporate solvent. As the droplets get smaller, the electrical surface charge density increases until such time that the natural repulsion between like charges causes ions as well as neutral molecules to be released.

The term "Atmospheric Pressure Chemical Ionization" or "APCI," as used herein, refers to mass spectroscopy methods that are similar to ESI, however, APCI produces ions by ion-molecule reactions that occur within a plasma at atmospheric pressure. The plasma is maintained by an electric discharge between the spray capillary and a counter electrode. Then, ions are typically extracted into a mass analyzer by use of a set of differentially pumped skimmer stages. A counterflow of dry and preheated $N_2$ gas may be used to improve removal of solvent. The gas-phase ionization in APCI can be more effective than ESI for analyzing less-polar species.

The term "Atmospheric Pressure Photoionization" ("APPI"), as used herein, refers to the form of mass spectroscopy where the mechanism for the photoionization of molecule M is photon absorption and electron ejection to form the molecular M+. Because the photon energy typically is just above the ionization potential, the molecular ion is less susceptible to dissociation. In many cases it may be possible to analyze samples without the need for chromatography, thus saving significant time and expense. In the presence of water vapor or protic solvents, the molecular ion can extract H to form MH+. This tends to occur if M has a high proton affinity. This does not affect quantitation accuracy because the sum of M+ and MH+ is constant. Drug compounds in protic solvents are usually observed as MH+, whereas nonpolar compounds such as naphthalene or testosterone usually form M+ (see e.g., Robb et al., 2000, *Anal. Chem.* 72(15): 3653-3659).

The term "inductively coupled plasma," as used herein, refers to methods in which a sample is interacted with a partially ionized gas at a sufficiently high temperature to atomize and ionize most elements.

Many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims. Although specific terms are employed herein, they are used in a generic and descriptive sense only and not for purposes of limitation. The disclosure utilizes the abbreviations shown below.

Methods for Improved Quality Assurance for High-Throughput Analytical Techniques Disclosed are methods for improved quality assurance for high-throughput analytical techniques. The methods may be embodied in a variety of ways.

In certain embodiments, disclosed is a method for confirming the identification of samples processed by a high-throughput analytical technique, the method comprising: distributing a plurality of individual samples to individual predetermined positions of a multi-sample test unit; distributing an identifier material to at least one predetermined position of the multi-sample test unit; determining the absence or presence of an analyte in the plurality of individual samples; and determining the absence or presence of the identifier material, wherein the presence of the identifier material at the predetermined position of the multi-sample test unit is used to confirm the identity of the plurality of individual samples positioned in the multi-sample test unit.

In certain embodiments, the method may comprise selecting as the identifier material a compound that is distinct from the analyte of interest and/or optionally distinct from an internal standard used to assess quantitative recovery of the analyte, but that can be detected using the same analysis as the analyte.

In certain embodiments, the predetermined position of the identifier material is distinct from any of the predetermined positions used for the samples. Or, in some cases, the identifier material may be added to a position that also includes a sample.

In certain embodiments, the predetermined position of the identifier material is different for different multi-sample test units. In this way, the identifier material may, in certain embodiments, be used to identify the multi-sample test unit and/or to distinguish one multi-sample test unit from another multi-sample test unit. In certain embodiments, the multi-sample test unit is a 96-well plate. Or, other multi-sample test units may be used.

For example, in some cases, as many as 80 or more multi-sample plates may be used to assay a plurality of samples for a single analyte or multiple analytes (with, e.g., the first and last rows A and H used for standards and/or internal controls). Thus, plate 1 may have the identifier material as position B1, plate 2 may have the identifier material at position B2, and so forth. For a larger number of multi-sample test units (e.g., greater than 80 plate of 96 wells each), the identifier material may be positioned at a plurality of positions. Thus, for plate 81, the identifier material may be positioned at B1 and B2, and, for plate 82, the identifier material may be positioned at B1 and B3, and so forth. Having the identifier material at multiple positions in each of the multi-sample testing units affords numerous iterations of combinations for identifier material positioning.

The disclosed methods may be applied to a variety of techniques. In certain embodiments, the determining step may comprise mass spectrometry (MS) or tandem-mass spectrometry (MS/MS), or liquid chromatography tandem mass spectrometry (LC-MS/MS). For mass spectrometry, the identifier material can have a different mass to charge (m/z) ratio than the analyte and/or optionally a different mass to charge (m/z) ratio than the internal standard used for the determination of analyte. Or, other techniques such as polymerase chain reaction (PCR) analysis of samples (e.g., allele-specific PCR, quantitative PCR), or nucleic acid sequencing may be used.

To facilitate high-throughput analysis, the identifier material may be selected so that it can be detected using the same determining step conditions as the analyte. For example, for LC-MS/MS analysis, the plate identifier material may be chosen so that it can be analyzed under the same LC and MS/MS ionization conditions used for the analyte. Or, for PCR or sequencing analysis, an exogenous template having sites that can hybridize with the primers used for determination of the analyte may be used.

In certain embodiments, the identifier material is a different compound than an internal standard used to assess quantitative recovery of the analyte. For example, for MS analysis where the analytes are ethyl glucuronide and ethyl sulfate (ETG and ETS), and the analytical technique is mass spectrometry (e.g., LC-MS/MS), the internal standard for ETG is the penta-deuterated isotope of ETG (D5-ETG), the internal standard for ETS is the penta-deuterated isotope of ETS (D5-ETS), and the identifier material is tri-deuterated (D3) dicarboxylic acid methylmalonate (MMA-D3). Alternatively, in certain embodiments, the identifier material is the same compound as an internal standard used to assess quantitative recovery of the analyte, but is labeled with a different isotope or a different number of isotopes. For example, for MS analysis where the analyte is 11-nor-9-carboxy-$\Delta^9$-tetrahydrocannabinol (THC-COOH), and the analytical technique is mass spectrometry, the tri-deuterated (D3) THC-COOH compound may be the internal standard and the identifier material may be the nona-deuterated (D9) compound THC-COOH. Or, where the analyte is 6-monoacetylmorphine (6MAM), and the analytical technique is mass spectrometry, the internal standard may be the tri-deuterated (D3) equivalent of 6MAM, and the identifier material may be the hexa-deuterated (D6) equivalent of 6-MAM.

In some embodiments, a plurality of different analytes may be analyzed simultaneously using a single identifier material. For example, in certain embodiments the analyte is at least one of buprenorphine, norbuprenorphine or naloxone, and the identifier material is (D6)-codeine. In certain embodiments, the analyte is at least two, or, optionally, each of buprenorphine, norbuprenorphine or naloxone, and the identifier material is (D6)-codeine.

Also disclosed herein are methods for selecting the appropriate standards to be used as the identifier material. Thus, in certain embodiments, disclosed is a method for selecting an identifier material for confirming the identification of samples processed by a high-throughput analytical technique comprising selecting a compound that is distinct from the analyte of interest and, optionally, distinct from an internal standard used to assess quantitative recovery of the analyte, but that can be detected using the same analysis and/or method of determination as the analyte. To facilitate high-throughput analysis, the identifier material may be selected so that it can be detected using the same determining step conditions as the analyte.

The disclosed methods may be applied to a variety of techniques. In certain embodiments, the determining step may comprise tandem-mass spectrometry (MS/MS) and/or LC-MS/MS. For mass spectrometry, the identifier material can have a different mass to charge (m/z) ratio than the analyte. In certain embodiments, the identifier material is a different compound than an internal standard used to assess quantitative recovery of the analyte. In some cases, the identifier material is the same compound as an internal standard used to assess quantitative recovery of the analyte, but is labeled with a different isotope or a different number of isotopes. Or, for PCR or sequencing analysis, an exogenous template, having sites that can hybridize with the primers used for determination of the analyte may be used.

An embodiment of the disclosed method 100 is shown in FIG. 1. Thus, as illustrated in FIG. 1, the method may comprise selecting an appropriate identifier material 104. The determination of the plate identifier material can be constrained by considerations for the analytical approach. Generally, high-throughput analytical mass spectrometry measurements will use bypass valves in order to reduce contamination of the MS source by compounds unrelated to the analyte of interest (i.e., measurand). Therefore, in certain embodiments, the identifier material is chosen to be a molecule having similar chromatographic properties as the analyte of interest, so as to maintain the bypass valve window. Additionally, the preferred ionization mode (type and polarity) should be consistent between the measurand(s) and the plate identifier material.

In LC-MS/MS workflows, isotopic internal standards may be used as a corrective function for extraction recovery, adsorptive loss, ionization suppression, etc. They may also be considered as a truly exogenous substance, which has a distinct signal when measured by mass spectrometry. The plate identifier material may comprise a material that is compatible with the assay conditions, but can be distinguished from the measurand(s) and any internal standards. In certain embodiments, the plate identifier may be an isotopically-labeled compound. The isotopically labeled compound may be the same as the measurand (except that it is labeled with an isotope) or it may be a different compound. Alternatively, in certain embodiments the plate identifier may be a non-labeled compound that is structurally related to, but distinct from, the measurand(s). In an embodiment, the non-labeled plate identifier may be commercially available.

Thus, in certain embodiments for MS analysis, discrete isotopes (which may be commercially available) that are significantly different in the degree of labeling to provide a distinct MS transition with no overlap in either the actual analyte or the quantitative internal standard may be used as a plate identifier. For example, to assay 11-nor-9-carboxy-$\Delta^9$-tetrahydrocannabinol (THC-COOH) by MS, the tri-deuterated (D3) THC-COOH compound may be used as an internal standard and the identifier material may be the nona-deuterated (D9) compound. These compounds may be commercially available. To assay 6-monoacetylmorphine (6MAM) by MS, the internal standard used for quantitation may be the tri-deuterated compound, and the identifier material may be the hexa-deuterated (D6) compound equivalent of 6-MAM. In such embodiments, wherein the plate identifiers are unique isotopically labeled compounds of the measurands, alignment of the chromatography and the ionization technique/settings can be assured.

In other embodiments, as, for example, when there is only a single isotopically labeled equivalent is available for the measurand of interest, a compound that is different from the measurand, but similar enough in chemical structure to be measured using the measurand assay conditions, may be chosen as the plate identifier. For example, to assay a compound such as ethyl glucuronide/ethyl sulfate (ETG/ETS) by MS, there may be only a single labeled version of each compound commercially available. The plate identifier may be chosen based on an expectation for similar chromatographic performance and ionization modality. In certain embodiments, the separation for ETG/ETS is a mix of HILIC/ion exchange and negative ionization electrospray is used. Based on the conditions used for measurand purification and MS analysis, the tri-deuterated (D3) dicarboxylic acid methylmalonate (MMA-D3) may be selected as the plate identifier material. Under certain assay conditions used, MMA-D3 elutes between the ETG and ETS. Additionally, in an embodiment, the mobile phases using this combination of measurand, internal standards, and plate identifier can provide for acceptable ionization cross-section, maintaining the bypass valve window.

In some embodiments, a plurality of different analytes may be analyzed simultaneously using a single identifier material. For example, in one embodiment for MS analysis, the analyte is at least one of buprenorphine, norbuprenorphine or naloxone, and the identifier material is (D6)-codeine. In certain embodiments, the analyte is at least two, or, optionally, each of buprenorphine, norbuprenorphine or naloxone, and the identifier material is (D6)-codeine.

Or, as noted herein, for PCR or sequencing analysis of the analyte, an exogenous template having sites that can hybridize with the primers used for determination of the analyte may be used. Or, other identifier materials, distinct from the measurand and, optionally, from any internal standards, may be used for other types of analytic determinations.

The method may further comprise distributing samples to defined positions in a multi-sample testing unit 106. The method may also comprise distributing the identifier material to a predetermined position or positions in the multi-sample test unit 108.

The method may further comprise pre-treating and/or purifying the sample analyte prior to determination of the analyte 109. In certain embodiments, the samples and/or identifier material may be distributed to defined positions in a multi-sample testing unit prior to any pre-treatment and/or purification steps (e.g. hydrolysis, extraction, precipitation and reconstitution, and the like) needed for the analytic determination. In certain embodiments, the identifier material is subjected to the pre-treatment and/or purification steps. In certain embodiments, the identifier material is not subjected to the pre-treatment and/or purification steps.

In certain embodiments, the multi-sample test unit may be a 96-well plate. Thus, each batch within an assay may include the plate identifier material in a distinct position. For example, in certain embodiments, the plate identifier material may be positioned so as to increment one well position for each plate of analysis. The plate identifier material may be placed within the group of samples, so as to replace one sample position with the identifier material. In an embodiment, the identifier material is not positioned in wells reserved for any calibrators or other quality control (QC) compounds. For example, and not to be limiting, for a plate that uses 16 total wells for blanks, standards and quality controls (QCs), (2 curves/plate bracketing the specimens), and having 79 wells remaining for samples and a single plate identifier material, there would be 80 plates each with a unique identifier position (e.g., B1, B2 . . . G12) prior to repeating the same well with the plate identifying material. In instances of very high volume testing, the use of 2 wells/plate with the identifier material further expands the interval between repeating of a well or wells. Any of the steps may be automated and/or controlled by a computer. For example, Hamilton methodology is capable of tracking the location of the plate identifier materials within the wells and across multiple plates. The well locations of all samples may be assigned in a file, which can be loaded into the mass spectrometer for acquisition and injected in sequential order with the batch.

The method may then include the step of determining the absence or presence of the analyte of interest (e.g., THC-COOH or another analyte) in the samples 110. Additionally, the method may comprise determining the absence of presence of the identifier material (e.g., (D9)-THC-COOH) at the predefined position in each of the multi-sample testing units 112. At this point, if the identifier material is found at the correct position 114, the plate (and sample) identity is confirmed, and the results may be reported out 116.

Systems

Also disclosed are systems for performing the methods herein. For example, the system may comprise a station or component (or stations or components) for performing various steps of the methods. In certain embodiments, a station or component may comprise a robotic or computer-controlled station or component for performing a step or steps of the method. In certain embodiments, disclosed is a system for confirming the identification of samples processed by a high-throughput analytical technique comprising: a station or component for distributing a plurality of individual samples to individual predetermined positions of a multi-sample test unit; a station or component for distributing an identifier material to at least one predetermined position of the multi-sample test unit; a station or component for determining the absence or presence of an analyte in the plurality of individual samples; and a station or component for determining the absence or presence of the identifier material at the least one predetermined position of the multi-sample test unit, wherein the presence of the identifier material at the predetermined position of the multi-sample test unit is used to confirm the identity of the plurality of individual samples positioned in the multi-sample test unit.

In certain embodiments, the system may comprise a station or component selecting as the identifier material a compound that is distinct from the analyte of interest and/or optionally distinct from an internal standard used to assess quantitative recovery of the analyte, but that can be detected using the same analysis as the analyte.

In certain embodiments, the predetermined position of the identifier material is distinct from any of the predetermined positions used for the samples. Or in some cases, the identifier material may be added to a position that also includes a sample.

In certain embodiments, the predetermined position of the identifier material is different for different multi-sample test units. In this way, the identifier material may, in certain embodiments, be used to identify the multi-sample test unit and/or to distinguish one multi-sample test unit from another multi-sample test unit. In certain embodiments, the multi-sample test unit is a 96-well plate. Or, other multi-sample test units may be used.

For example, in some cases, as many as 80 or more multi-sample plates may be used in the system to assay a plurality of samples for a single analyte or multiple analytes (with e.g., the first and last rows A and H used for standards and/or internal controls). Thus, plate 1 may have the identifier material as position B1, plate 2 may have the identifier material at position B2, and so forth. For a larger number of multi-sample test units (e.g., greater than 80 plate of 96 wells each) the identifier material may be positioned at a plurality of positions. Thus, for plate 81, the identifier material may be positioned at B1 and B2, and for plate 82, the identifier material may be positioned at B1 and B3, and so forth. Having the identifier material at multiple positions in each of the multi-sample testing units affords numerous iterations of combinations for identifier material positioning.

The disclosed systems may be applied to a variety of techniques. In certain embodiments, the determining step may comprise mass spectrometry (MS) or tandem-mass spectrometry (MS/MS), or liquid chromatography tandem mass spectrometry (LC-MS/MS). For mass spectrometry, the identifier material can have a different mass to charge (m/z) ratio than the analyte and/or optionally a different mass to charge (m/z) ratio than the internal standard used for the determination of analyte. Or, other techniques such as polymerase chain reaction (PCR) analysis of samples (e.g., allele-specific PCR, quantitative PCR), or nucleic acid sequencing may be used.

To facilitate high-throughput analysis, the identifier material may be selected so that it can be detected using the same determining step conditions as the analyte. For example, for LC-MS/MS analysis, the plate identifier material may be chosen so that it can be analyzed under the same LC and MS/MS ionization conditions used for the analyte. Or, for PCR or sequencing analysis, an exogenous template, having sites that can hybridize with the primers used for determination of the analyte may be used.

In certain embodiments, the identifier material is a different compound than an internal standard used to assess quantitative recovery of the analyte. For example, for MS analysis where the analytes are ethyl glucuronide and ethyl sulfate (ETG and ETS), and the analytical technique is mass spectrometry (e.g., LC-MS/MS), the internal standard for ETG is the penta-deuterated equivalent of ETG (D5-ETG), the internal standard for ETS is the penta-deuterated equivalent of ETS (D5-ETS), and the identifier material is tri-deuterated (D3) dicarboxylic acid methylmalonate (MMA-D3). Alternatively, in certain embodiments, the identifier material is the same compound as an internal standard used to assess quantitative recovery of the analyte, but is labeled with a different isotope or a different number of isotopes. For example, for MS analysis where the analyte is 11-nor-9-carboxy-$\Delta^9$-tetrahydrocannabinol (THC-COOH), and the analytical technique is mass spectrometry, the tri-deuterated (D3) THC-COOH compound may be the internal standard and the identifier material may be the nona-deuterated equivalent compound (D9) THC-COOH. Or, where the analyte is 6-monoacetylmorphine (6MAM), and the analytical technique is mass spectrometry, the internal standard may be the tri-deuterated (D3) isotope, and the identifier material may be the hexa-deuterated (D6) equivalent of 6-MAM.

In some embodiments, a plurality of different analytes may be analyzed simultaneously using a single identifier material. For example, in one embodiment the analyte is at least one of buprenorphine, norbuprenorphine, or naloxone, and the identifier material is (D6)-codeine. In certain embodiments, the analyte is at least two, or, optionally, each of buprenorphine, norbuprenorphine, or naloxone, and the identifier material is (D6)-codeine.

Figure 2:
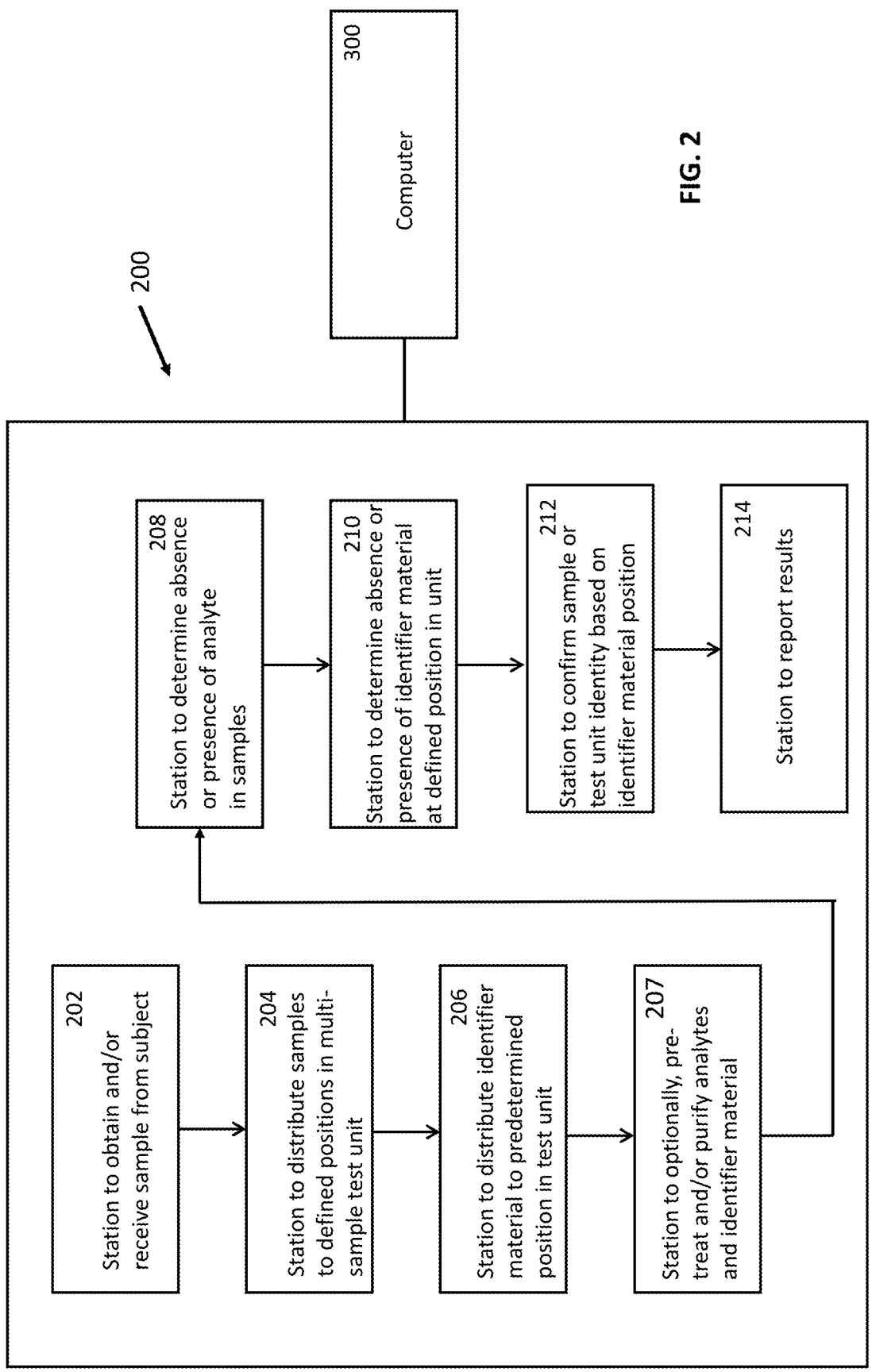
FIG. 2 schematically illustrates a system for incorporation of plate identifier material for high-throughput analysis of samples by in accordance with an embodiment of the disclosure.

FIG. 2 illustrates one embodiment of a system 200 for pathogen detection The system may comprise a station or component for obtaining a sample from a subject 202. The sample may be a biological sample, such as blood, plasma, serum or urine. The system may further comprise a station or component 204 for distributing the samples to defined positions in a plurality of multi-sample test units, as for example 96-well plates. The system may further comprise a station or component 206 for distributing the identifier material to a predetermined position (or positions) in the multi-sample test units. In certain embodiments, the station or component for positioning (e.g., aliquoting) samples 204 and the station or component for positioning (e.g., aliquoting) the identifier material 206 may be a single station or component. The system may further comprise a station or component (not shown) for positioning internal standard in the multi-sample test unit.

The system may further comprise a station or component for pre-treating and/or purifying the sample analyte prior to determination of the analyte 207. In certain embodiments, the samples and/or identifier material may be distributed to defined positions in a multi-sample testing unit prior to any pre-treatment and/or purification steps (e.g. hydrolysis, extraction, precipitation and reconstitution, and the like) needed for the analytic determination. In certain embodiments, the identifier material is subjected to the pre-treatment and/or purification steps. In certain embodiments, the identifier material is not subjected to the pre-treatment and/or purification steps.

The system may further comprise a station or component for determining the absence or presence of the analyte of interest 208 and a station or component for determining the absence or presence of the identifier material 210. In certain embodiments, the station or component for determining the absence or presence of the analyte of interest 208 and a station or component for determining the absence or presence of the identifier materials 210 may be a single station or component.

The system may further comprise a station or component 212 for confirming plate (and sample) identity, if the identifier material is found at the correct position, and a station or component 214 for reporting the results.

As illustrated in FIG. 2, any of the stations or components may be automated, robotically controlled, and/or controlled at least in part by a computer 300 and/or programmable software. Thus, the system may comprise a computer-program product tangibly embodied in a non-transitory machine-readable storage medium, including instructions configured to run the system or any part (e.g., station or component) of the system and/or perform a step or steps of the methods of any of the disclosed embodiments. In some embodiments, a system is provided that includes one or more data processors and a non-transitory computer readable storage medium containing instructions which, when executed on the one or more data processors, cause the one or more data processors to perform part or all of one or more methods or processes disclosed herein and/or run any of the parts of the systems disclosed herein.

For example, disclosed is a system comprising one or more data processors, and a non-transitory computer readable storage medium containing instructions which, when executed on the one or more data processors, cause the one or more data processors to perform actions to direct at least one of the steps of confirming the identification of samples processed by a high-throughput analytical technique comprising: distributing a plurality of individual samples to individual predetermined positions of a multi-sample test unit; distributing an identifier material to at least one predetermined position of the multi-sample test unit; determining the absence or presence of an analyte in the plurality of individual samples; and determining the absence or presence of the identifier material, wherein the presence of the identifier material at the predetermined position of the multi-sample test unit is used to confirm the identity of the plurality of individual samples positioned in the multi-sample test unit. Also disclosed is a system comprising one or more data processors, and a non-transitory computer readable storage medium containing instructions which, when executed on the one or more data processors, cause the one or more data processors to perform actions to direct at least one of the steps of selecting an identifier material for confirming the identification of samples processed by a high-throughput analytical technique, comprising selecting a compound that is distinct from the analyte of interest and optionally distinct from an internal standard used to assess quantitative recovery of the analyte, but that can be detected using the same analysis as the analyte.

Also disclosed is a computer-program product tangibly embodied in a non-transitory machine-readable storage medium, including instructions configured to run the systems and/or perform a step or steps of the methods of any of the disclosed embodiments. For example, in certain embodiments, the computer-program product tangibly embodied in a non-transitory machine-readable storage medium includes instructions configured to cause one or more data processors to perform actions to direct at least one of the steps of confirming the identification of samples processed by a high-throughput analytical technique, comprising: distributing a plurality of individual samples to individual predetermined positions of a multi-sample test unit; distributing an identifier material to at least one predetermined position of the multi-sample test unit; determining the absence or presence of an analyte in the plurality of individual samples; and determining the absence or presence of the identifier material, wherein the presence of the identifier material at the predetermined position of the multi-sample test unit is used to confirm the identity of the plurality of individual samples positioned in the multi-sample test unit. Additionally and/or alternatively, in certain embodiments, the computer-program product tangibly embodied in a non-transitory machine-readable storage medium includes instructions configured to cause one or more data processors to perform actions to direct at least one of the steps of selecting an identifier material for confirming the identification of samples processed by a high-throughput analytical technique, comprising selecting a compound that is distinct from the analyte of interest and optionally distinct from an internal standard used to assess quantitative recovery of the analyte, but that can be detected using the same analysis as the analyte.

The systems and computer products may perform any of the methods disclosed herein. One or more embodiments described herein can be implemented using programmatic modules, engines, or components. A programmatic module, engine, or component can include a program, a sub-routine, a portion of a program, a software component, or a hardware component capable of performing one or more stated tasks or functions. As used herein, a module or component can exist on a hardware component independently of other modules or components. Alternatively, a module or component can be a shared element or process of other modules, programs or machines.

Figure 3:
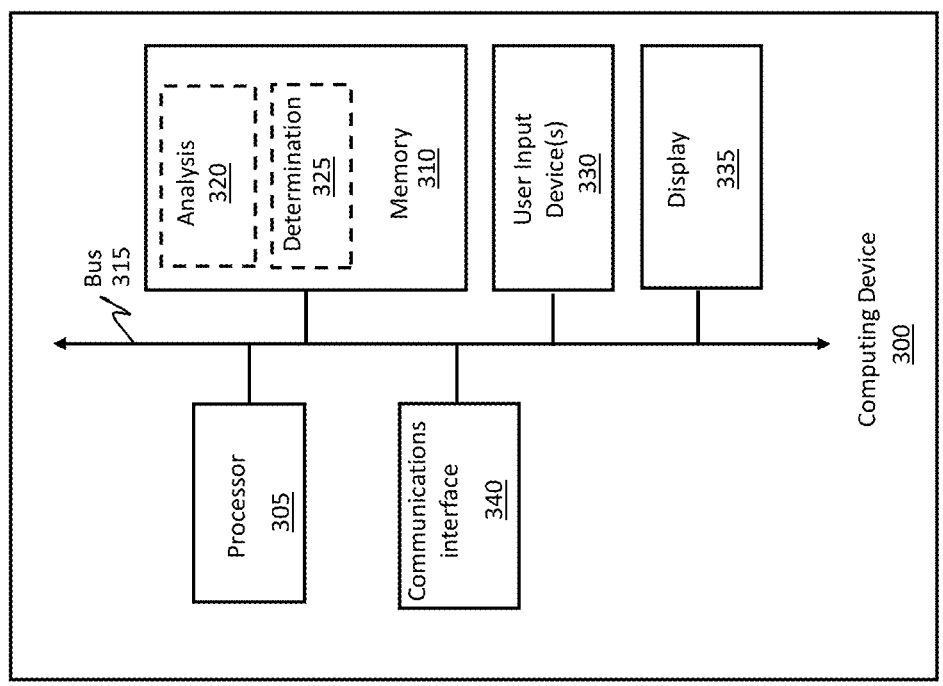
FIG. 3 schematically illustrates an exemplary computing device in accordance with various embodiments of the disclosure.

FIG. 3 shows a block diagram of an analysis system 300 used for detection and/or quantification of a pathogen. As illustrated in FIG. 3, modules, engines, or components (e.g., program, code, or instructions) executable by one or more processors may be used to implement the various subsystems of an analyzer system according to various embodiments. The modules, engines, or components may be stored on a non-transitory computer medium. As needed, one or more of the modules, engines, or components may be loaded into system memory (e.g., RAM) and executed by one or more processors of the analyzer system. In the example depicted in FIG. 3, modules, engines, or components are shown for implementing the methods of the disclosure.

Thus, FIG. 3 illustrates an example of a computing device 300 suitable for use with systems and methods according to this disclosure. The example of a computing device 300 includes a processor 305, which is in communication with the memory 310 and other components of the computing device 300 using one or more communications buses 315. The processor 305 is configured to execute processor-executable instructions stored in the memory 310 to perform one or more methods or operate one or more stations or components for detecting pathogen levels according to different examples, such as those illustrated in FIGS. 1-2 and 4-7 or disclosed elsewhere herein. In this example, the memory 310 may store processor-executable instructions 325 that can analyze 320 results for sample or test unit confirmation as discussed herein.

The computing device 300 in this example may also include one or more user input devices 330, such as a keyboard, mouse, touchscreen, microphone, etc., to accept user input. The computing device 300 may also include a display 335 to provide visual output to a user, such as a user interface. The computing device 300 may also include a communications interface 340. In some examples, the communications interface 340 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

EXAMPLES

The disclosure may be better understood by reference to the following non-limiting examples.

Example 1

Example assays utilizing the disclosed method include MS analysis of 11-nor-9-carboxy-$\Delta^9$-tetrahydrocannabinol (THC-COOH), 6-monoacetylmorphine (6-MAM) and ethyl glucuronide/ethyl sulfate (ETG/ETS).

Selection of Plate Identifier Material

In two of the example assays, discrete isotopes were commercially available that were significantly different in the degree of labeling to provide a distinct MS transition with no overlap in either the actual analyte or the quantitative internal standard.

For the THC-COOH assay, the quantitative internal standard is the tri-deuterated (D3) THC-COOH compound (Sigma Aldrich, Round Rock TX). The plate identifier compound is the nona-deuterated (D9) compound (Sigma Aldrich, Round Rock TX). For the 6-MAM assay, the internal standard used in quantitation is the tri-deuterated compound; the plate identifier is the hexa-deuterated (D6) equivalent of 6-MAM. As the plate identifiers for both assays are unique isotopically labeled equivalents of the measurands, alignment of the chromatography and the ionization technique/settings is assured.

Figure 4:
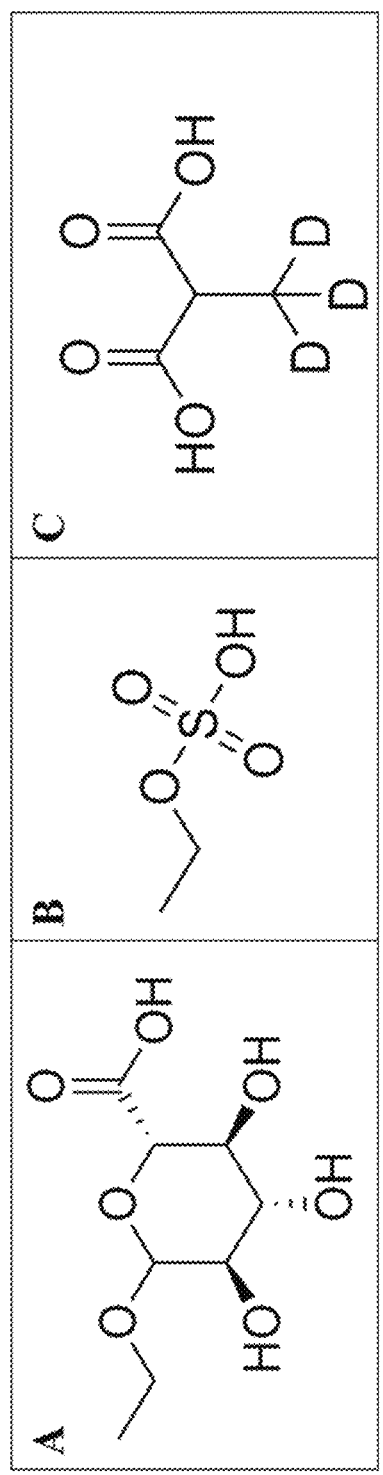
FIG. 4 shows the chemical structures of ethyl glucuronide (A), ethyl sulfate (B) and D3-methylmalonate (C)

For the ETG/ETS assay, only a single labeled version of each compound was commercially available. The plate identifier was chosen based on an expectation for similar chromatographic performance and ionization modality. The separation for ETG/ETS is a mix of HILIC/ion exchange and utilizes negative ionization electrospray. In this case, the tri-deuterated (D3) dicarboxylic acid methylmalonate (MMA-D3) was selected as the plate identifier material. This compound eluted between the ETG and ETS, and the mobile phases provided for acceptable ionization cross-section, maintaining the bypass valve window. Structures of ETG, ETS and (MMA-D3) are shown in FIG. 4.

Analysis of the Plate Identifier Material

Sample preparation used for each of the demonstrated assays is dilution, with the THC-COOH assay undergoing alkaline hydrolysis prior to a secondary dilution. Each of the assays are prepared on an automated liquid handler (Hamilton, Reno NV). All reagents, calibrators, QC's, samples and plates are bar coded and read during the sample preparation phase. In addition to quantitative QC's used in assessing assay performance, an additional vial of the plate identifier material was included in the sample racks. As a function of liquid handling, each batch within an assay includes the plate identifier material in a distinct position, incrementing 1 well position for each plate of analysis. This vial is placed within the group of samples, not replacing calibrators or QC's. For a plate that uses 16 total wells for blanks, standards and QC's, (2 curves/plate bracketing the specimens), there are 80 plates with a unique location prior to repeating the same well with the plate identifying material. In instances of very high volume testing, the use of 2 wells/plate with the identification material further expands the interval between repeating of a well or wells. Hamilton methodology is capable of tracking the location of the plate identifier materials within the wells and across multiple plates. The well locations of all samples are assigned in a file which is loaded into the mass spectrometer for acquisition and injected in sequential order with the batch. The MS/MS transitions for each of the plate identifier materials are shown in Table 1.

TABLE 1

MS/MS Transitions for the 3 plate identifier materials

| Molecule | Q1 | Q3 |
|---|---|---|
| Nona-Deuterated THC-COOH | 354.2 | 308.2 |
| Hexa-Deuterated 6-Monoacetyl Morphine | 334.2 | 165.1 |
| Tri-Deuterated Methylmalonic Acid | 120.1 | 76 |

Figure 5A:
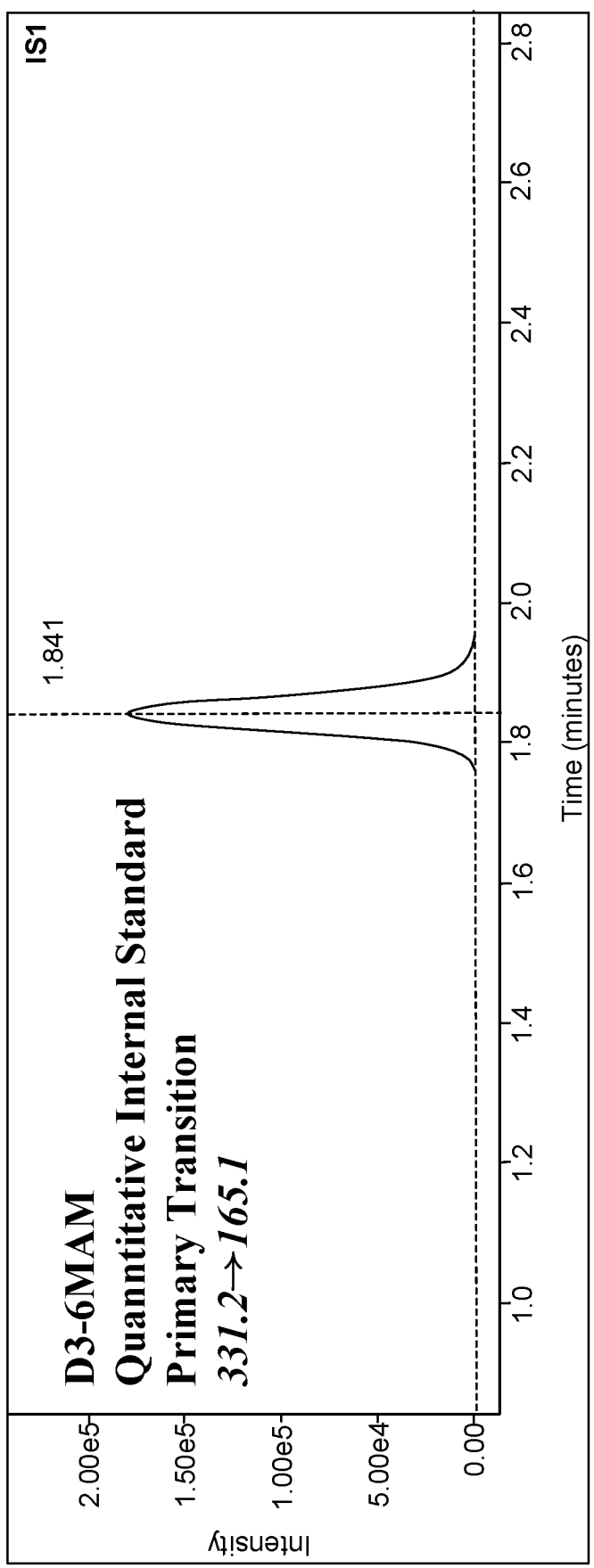
FIG. 5A and FIG. 5B show example chromatograms and MS/MS transitions of D3-6-MAM (Quantitative internal standard, top) and D6-6-MAM (Plate Identification Material, bottom).
Figure 5B:
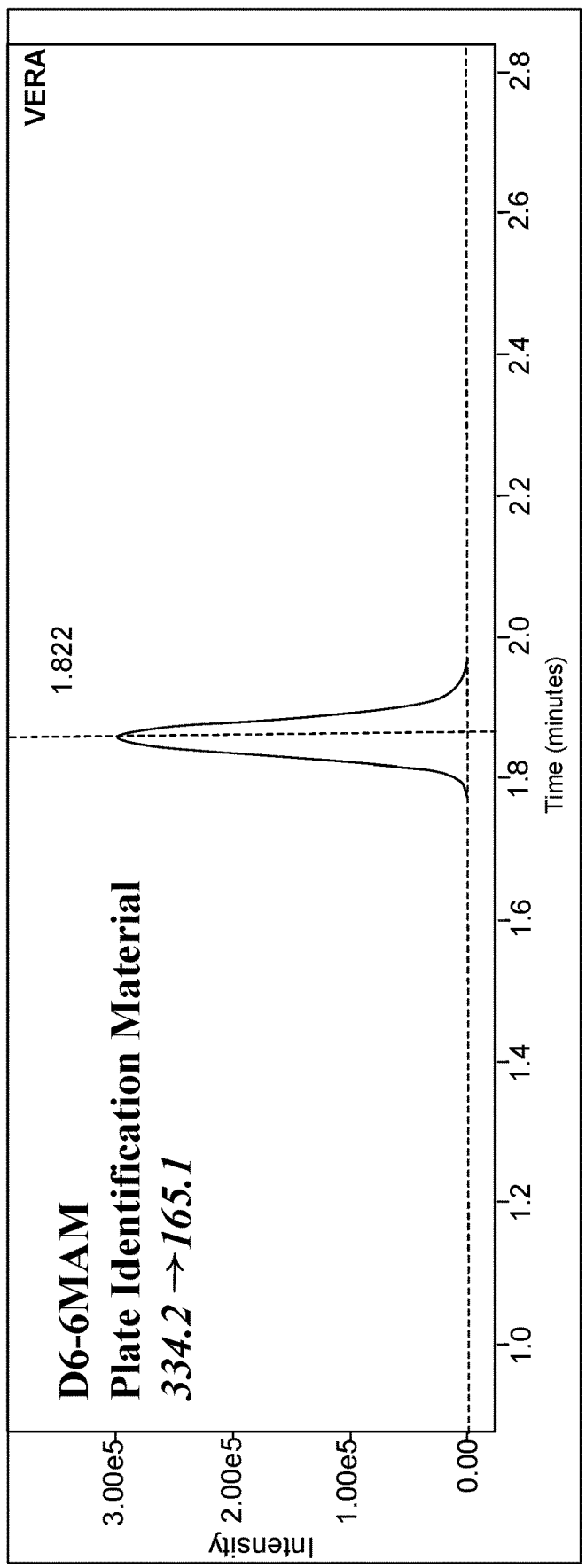
Figure 6A:
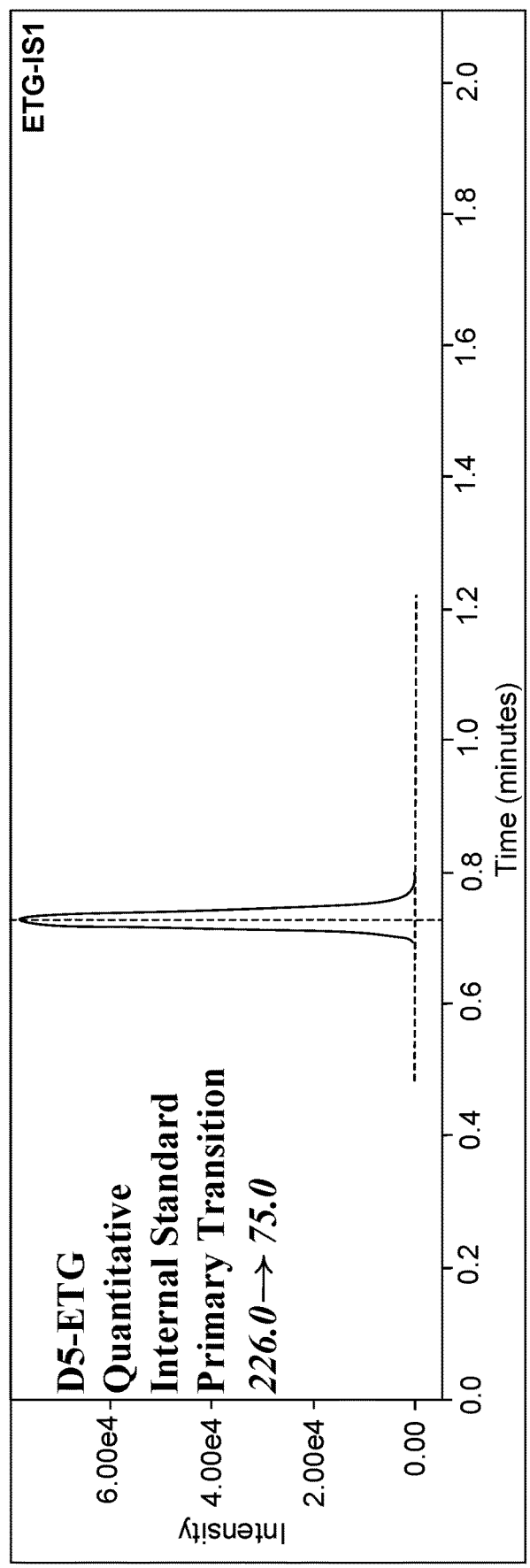
FIG. 6A, FIG. 6B, and FIG. 6C show example chromatograms and MS/MS transitions of ETG Internal Standard (Top, retention time≈0.74 min), ETS Internal Standard (Middle, retention time≈1.38 min) and the D3-Methylmalonic Acid Plate Identification Material (retention time≈1.21 min). Tailing of the D3-MMA is a feature of the chromatographic interaction.
Figure 6B:
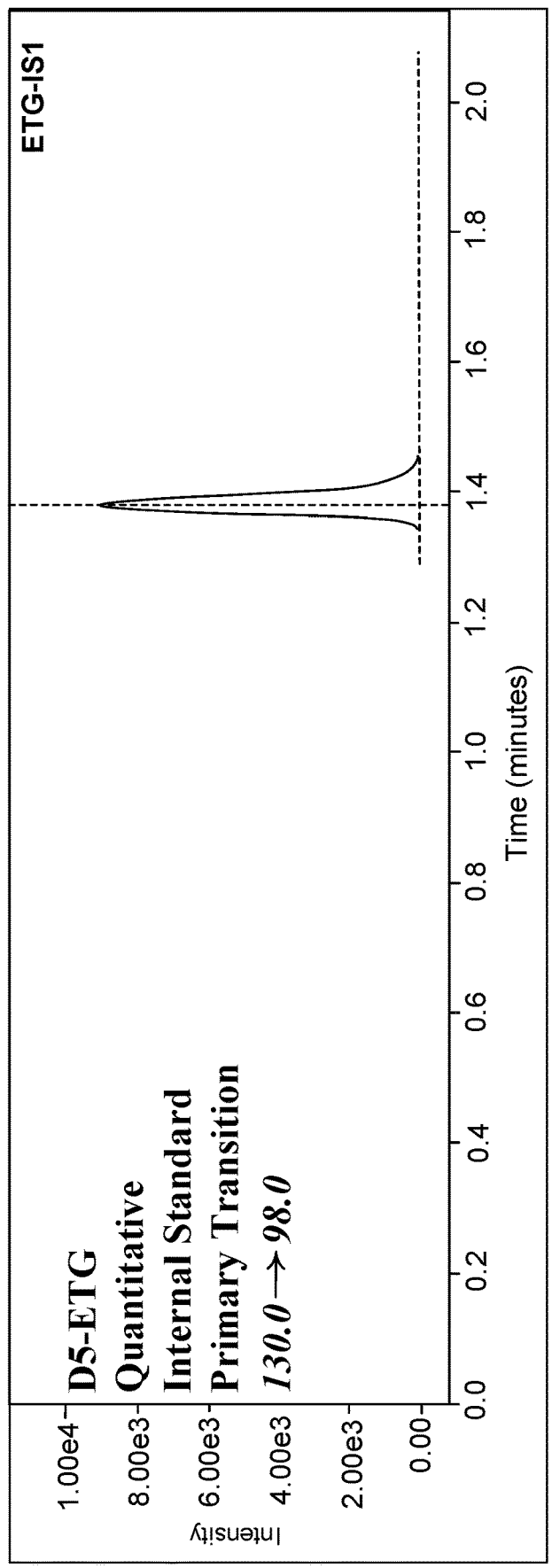
Figure 6C:
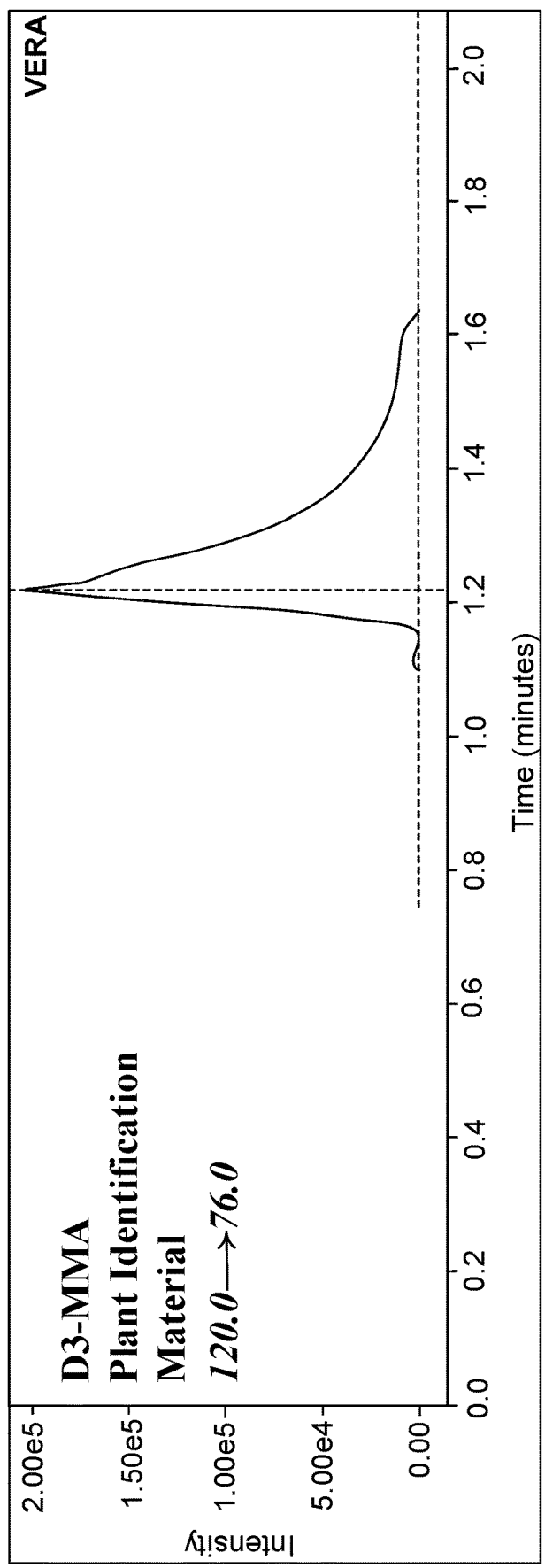

All plates were assayed from a 7-plate Waters Sample Organizer; plate location assignments were done by barcode scanning of a plate position identifier and the 96-well plate itself. Acquisition queues for each batch were populated by an in-house program based on the Hamilton-generated file for each batch. FIG. 5A and FIG. 5B demonstrate an example of data from a calibration standard (injection position 5) and the plate-identifier material (injection position 61) in the analysis of 6-MAM. FIG. 6A, FIG. 6B, and FIG. 6C show the use of the D3-methylmalonic acid identifier material and its relative retention time to the ETG internal standard and to the ETS internal standard.

Data Review of the Plate Identifier Material

Each of the assays are data-processed through Ascent® software (Indigo BioAutomation, Carmel Indiana). A custom rule within Ascent was implemented in which the plate identifier material is recognized by sample name and screened for a minimum response. Rule-failure outcome in the event that the plate identifier material did not have the correct abundance (i.e. not detected) is that the entire batch is failed and cannot be reported. In those instances, the Ascent software error identification rate for that plate indicates 100%, which is visualized on screen at the initiation of data review. Minimum response criteria also served as an acute whole-system performance check against severely degraded ionization, significant leaks or other gross analysis errors during the run. Concentrations of the plate identifier solutions were titrated to reach an acceptable response level and the minimum response was set to 10-fold lower.

Validation of Plate Identification Material

The use of the plate identification material had no bearing on the quantitative accuracy, precision or selectivity of an assay. Therefore, validation was straightforward. Contribution of the plate-identifier material to either the analyte or quantitative internal standard was evaluated and found to be negligible (<20% of the lower limit of quantification response). As the plate identification materials were prepared in neat solvents, matrix-effects were not evaluated. For each assay, more than 2000 samples were evaluated for possible false positive signals due to isobaric or isotopic species; no signals contributing to the plate identification material transitions were observed. Rule outcomes were validated by not aliquoting the plate-identification material to the correct well. Upon analysis, Ascent software indicated the absence of any discernible peak in the transition for the plate identification material and failed the batch. In the laboratory setting, root cause analysis can be executed to determining if plates were inadvertently swapped, rotated, misplaced or misinjected. Both single and multiple failures of the plate identification material can be informative in identifying error-prone processes in sample handling.

Conclusions

The implementation of an automated plate identification procedure allows for the positive identification of 96-well plates throughout the LC-MS/MS process. Plate identifier materials are distinctly exogenous due to their isotopic nature. In the event that a separate isotope of a compound is not available, alternative species, such as the isotope of endogenous methylmalonate, can be utilized as an identifying compound. Monitoring of the plate identifier transitions in patient samples demonstrated no observable false positive signals across more than 2000 monitored samples for each assay. Inability to integrate a peak at the expected retention time of the plate identifier material led to batch rejection. Use of plate identification material as an unambiguous identifier is value added for high throughput assays using 96-well plates in context of quality assurance.

Example 2

Figure 7:
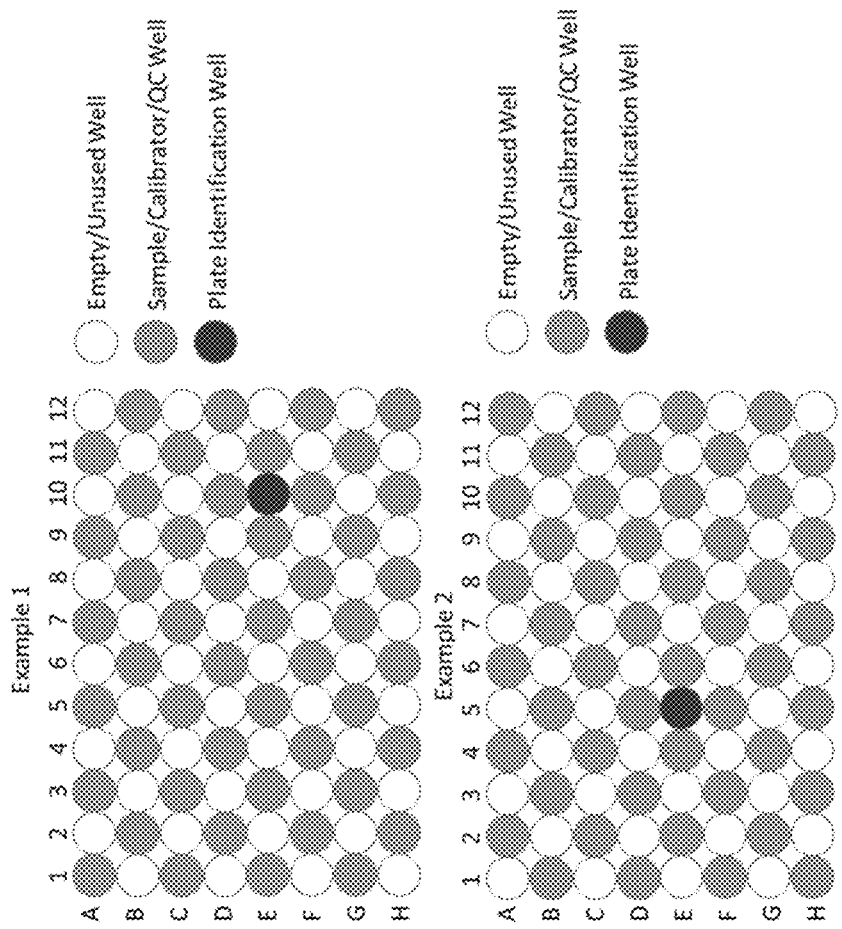
FIG. 7 shows an example of an assay for buprenorphine, norbuprenorphine and naloxone analyzed simultaneously by LC-MS/MS for each sample with D6-Codeine as the identifier material set-up for two 96-well plates including the identifier material positioned at a different location in each plate for identification of the plates and samples therein according to an embodiment of the disclosure.

LC-MS/MS analysis of buprenorphine, norbuprenorphine and naloxone is performed via enzymatic hydrolysis and dilution prior to LC-MS/MS. In this analysis, the three analytes (buprenorphine, norbuprenorphine and naloxone) are analyzed simultaneously by LC-MS/MS for each sample (i.e., all three analytes measured simultaneously from each sample well) with D6-Codeine as the identifier material. In order to prevent well-to-well contamination, the samples are placed into plates such that each sample well is not directly next to another sample well. The plate identification material for this assay, hexa-deuterated codeine (D6-Codeine), is placed in an unused well for analysis. This D6-Codeine solution does not receive any additional reagents used in the assay and is aliquoted separately to each plate while being prepared on the automated liquid handler. The identity and location of the plate identification material is added to the sample run list and assayed with the batch. Location of the plate contents iterates through plates to provide a separate "checkerboard" between individual plate analyses. FIG. 7 provides an illustration of two plates having the identifier material added at two different positions to provide discrimination between plate 1 (Example 1) and plate 2 (Example 2). As described herein, adding a second or third location for the plate identifier material in each plate affords numerous iterations of different plate identifiers.

Example 3—Embodiments

A1. A method for confirming the identification of samples processed by a high-throughput analytical technique comprising:
- distributing a plurality of individual samples to individual predetermined positions of a multi-sample test unit;
- distributing an identifier material to at least one predetermined position of the multi-sample test unit;
- determining the absence or presence of an analyte in the plurality of individual samples; and
- determining the absence or presence of the identifier material, wherein the presence of the identifier material at the predetermined position of the multi-sample test unit is used to confirm the identity of the plurality of individual samples positioned in the multi-sample test unit.

A2. The method of any of the previous or subsequent method embodiments, comprising selecting as the identifier material a compound that is distinct from the analyte of interest and/or optionally distinct from an internal standard used to assess quantitative recovery of the analyte, but that can be detected using the same analysis as the analyte.

A3. The method of any of the previous or subsequent method embodiments, wherein the predetermined position of the identifier material is distinct from any of the predetermined positions used for the samples.

A4. The method of any of the previous or subsequent method embodiments, wherein the predetermined position of the identifier material is different for different multi-sample test units.

A5. The method of any of the previous or subsequent method embodiments, wherein the multi-sample test unit is a 96-well plate.

A6. The method of any of the previous or subsequent method embodiments, wherein the determining step comprises tandem-mass spectrometry.

A7. The method of any of the previous or subsequent method embodiments, wherein the identifier material has a different mass to charge (m/z) ratio than the analyte and optionally, an internal standard.

A8. The method of any of the previous or subsequent method embodiments, wherein the identifier material can be detected using the same determining step conditions as the analyte.

A9. The method of any of the previous or subsequent method embodiments, wherein the identifier material is positioned at a plurality of distinct predetermined positions in each multi-sample test unit.

A10. The method of any of the previous or subsequent method embodiments, wherein the identifier material is a different compound than an internal standard used to assess quantitative recovery of the analyte.

A11. The method of any of the previous or subsequent method embodiments, wherein the analyte is ethyl glucuronide/ethyl sulfate (ETG/ETS), the internal standard for ETG is the penta-deuterated isotope of ETG (D5-ETG) and the internal standard for ETS is the penta-deuterated isotope of ETS (D5-ETS), and the identifier material is tri-deuterated (D3) dicarboxylic acid methylmalonate (MMA-D3).

A12. The method of any of the previous or subsequent method embodiments, wherein the identifier material is the same compound as an internal standard used to assess quantitative recovery of the analyte, but is labeled with a different isotope or a different number of isotopes.

A13. The method of any of the previous or subsequent method embodiments, wherein the analyte is 11-nor-9-carboxy-$\Delta^9$-tetrahydrocannabinol (THC-COOH), the internal standard is tri-deuterated (D3) THC-COOH, and the identifier material is nona-deuterated (D9) THC-COOH.

A14. The method of any of the previous or subsequent method embodiments, wherein the analyte is 6-monoacetylmorphine (6-MAM), the internal standard is the tri-deuterated (D3) isotope of 6-MAM, and the identifier material is hexa-deuterated (D6) 6-MAM.

A15. The method of any of the previous or subsequent method embodiments, wherein a plurality of different analytes may be analyzed simultaneously using a single identifier material.

A16. The method of any of the previous or subsequent method embodiments, wherein the analyte is at least one of buprenorphine, norbuprenorphine or naloxone and the identifier material is (D6)-codeine.

A17. The method of any of the previous or subsequent method embodiments, wherein the analyte is at least two, or optionally each of buprenorphine, norbuprenorphine or naloxone and the identifier material is (D6)-codeine.

B1. A method for selecting an identifier material for confirming the identification of samples processed by a high-throughput analytical technique comprising selecting a compound that is distinct from the analyte of interest and optionally distinct from an internal standard used to assess quantitative recovery of the analyte, but that can be detected using the same analysis as the analyte.

B2. The method of any of the previous or subsequent method embodiments, wherein the analyltical technique comprises tandem-mass spectrometry.

B3. The method of any of the previous or subsequent method embodiments, wherein the identifier material has a different mass to charge (m/z) ratio than the analyte and optionally, an internal standard.

B4. The method of any of the previous or subsequent method embodiments, wherein the identifier material can be detected using the same determining step conditions as the analyte.

B5. The method of any of the previous or subsequent method embodiments, wherein the identifier material is positioned at a distinct predetermined position in a multi-sample test unit.

B6. The method of any of the previous or subsequent method embodiments, wherein the identifier material is a different compound than an internal standard used to assess quantitative recovery of the analyte.

B7. The method of any of the previous or subsequent method embodiments, wherein the analyte is ethyl glucuronide/ethyl sulfate (ETG/ETS), the internal standard for ETG is the penta-deuterated isotope of ETG (D5-ETG), the internal standard for ETS is the penta-deuterated isotope of ETS (D5-ETS), and the identifier material is tri-deuterated (D3) dicarboxylic acid methylmalonate (MMA-D3).

B8. The method of any of the previous or subsequent method embodiments, wherein the identifier material is the same compound as an internal standard used to assess quantitative recovery of the analyte, but is labeled with a different isotope or a different number of isotopes.

B9. The method of any of the previous or subsequent method embodiments, wherein the analyte is 11-nor-9-carboxy-$\Delta^9$-tetrahydrocannabinol (THC-COOH), the internal standard is tri-deuterated (D3) THC-COOH, and the identifier material is nona-deuterated (D9) THC-COOH.

B10. The method of any of the previous or subsequent method embodiments, wherein the analyte is 6-monoacetylmorphine (6-MAM), the internal standard is the tri-deuterated (D3) isotope of 6-MAM, and the identifier material is hexa-deuterated (D6) 6-MAM.

B11. The method of any of the previous or subsequent method embodiments, wherein a plurality of different analytes may be analyzed simultaneously using a single identifier material.

B12. The method of any of the previous or subsequent method embodiments, wherein the analyte is at least one of buprenorphine, norbuprenorphine or naloxone and the identifier material is (D6)-codeine.

B12. The method of any of the previous or subsequent method embodiments, wherein the analyte is at least two or optionally, each of buprenorphine, norbuprenorphine or naloxone and the identifier material is (D6)-codeine.

C1. A system for confirming the identification of samples processed by a high-throughput analytical technique comprising:
   a station or component for distributing a plurality of individual samples to individual predetermined positions of a multi-sample test unit;
   a station or component for distributing an identifier material to at least one predetermined position of the multi-sample test unit;
   a station or component for determining the absence or presence of an analyte in the plurality of individual samples; and
   a station or component for determining the absence or presence of the identifier material, wherein the presence of the identifier material at the predetermined position of the multi-sample test unit is used to confirm the identity of the plurality of individual samples positioned in the multi-sample test unit.

C2. The system of any of the previous or subsequent system embodiments, comprising a station or component for selecting as the identifier material a compound that is distinct from the analyte of interest and/or optionally distinct from an internal standard used to assess quantitative recovery of the analyte, but that can be detected using the same analysis as the analyte.

C3. The system of any of the previous or subsequent system embodiments, wherein the predetermined position of the identifier material is distinct from any of the predetermined positions used for the samples.

C4. The system of any of the previous or subsequent system embodiments, wherein the predetermined position of the identifier material is different for different multi-sample test units.

C5. The system of any of the previous or subsequent system embodiments, wherein the multi-sample test unit is a 96-well plate.

C6. The system of any of the previous or subsequent system embodiments, wherein the determining station or component comprises tandem-mass spectrometry.

C7. The system of any of the previous or subsequent system embodiments, wherein the identifier material has a different mass to charge (m/z) ratio than the analyte and optionally, an internal standard.

C8. The system of any of the previous or subsequent system embodiments, wherein the identifier material can be detected using the same determining step conditions as the analyte.

C9. The system of any of the previous or subsequent system embodiments, wherein the identifier material is positioned at a plurality of distinct predetermined positions in each multi-sample test unit.

C10. The system of any of the previous or subsequent system embodiments, wherein the identifier material is a different compound than an internal standard used to assess quantitative recovery of the analyte.

C11. The system of any of the previous or subsequent system embodiments, wherein the analyte is ethyl glucuronide/ethyl sulfate (ETG/ETS), the internal standard for ETG is penta-deuterated ETG (D5-ETG), the internal standard for ETS is penta-deuterated ETS (D5-ETS), and the identifier material is tri-deuterated (D3) dicarboxylic acid methylmalonate (MMA-D3).

C12. The system of any of the previous or subsequent system embodiments, wherein the identifier material is the same compound as an internal standard used to assess quantitative recovery of the analyte, but is labeled with a different isotope or a different number of isotopes.

C13. The system of any of the previous or subsequent system embodiments, wherein the analyte is 11-nor-9-carboxy-$\Delta^9$-tetrahydrocannabinol (THC-COOH), the internal standard is tri-deuterated (D3) THC-COOH, and the identifier material is nona-deuterated (D9) THC-COOH.

C14. The system of any of the previous or subsequent system embodiments, wherein the analyte is 6-monoacetylmorphine (6-MAM), the internal standard is the tri-deuterated (D3) 6-MAM, and the identifier material is hexa-deuterated (D6) 6-MAM.

C15. The method of any of the previous or subsequent method embodiments, wherein a plurality of different analytes may be analyzed simultaneously using a single identifier material.

C16. The method of any of the previous or subsequent method embodiments, wherein the analyte is at least one of buprenorphine, norbuprenorphine or naloxone and the identifier material is (D6)-codeine.

C17. The method of any of the previous or subsequent method embodiments, wherein the analyte is at least two or optionally, each of buprenorphine, norbuprenorphine or naloxone and the identifier material is (D6)-codeine.

C18. The system of any of the previous or subsequent system embodiments including one or more data processors and a non-transitory computer readable storage medium containing instructions which, when executed on the one or more data processors, cause the one or more data processors to perform part or all of one or more methods of any of the previous embodiments and/or run any of the stations of the system.

C19. A system comprising one or more data processors, and a non-transitory computer readable storage medium containing instructions which, when executed on the one or more data processors, cause the one or more data processors to perform actions to direct at least one of the steps of confirming the identification of samples processed by a high-throughput analytical technique comprising:
distributing a plurality of individual samples to individual predetermined positions of a multi-sample test unit;
distributing an identifier material to at least one predetermined position of the multi-sample test unit;
determining the absence or presence of an analyte in the plurality of individual samples; and
determining the absence or presence of the identifier material, wherein the presence of the identifier material at the predetermined position of the multi-sample test unit is used to confirm the identity of the plurality of individual samples positioned in the multi-sample test unit.

C20. A system comprising one or more data processors, and a non-transitory computer readable storage medium containing instructions which, when executed on the one or more data processors, cause the one or more data processors to perform actions to direct at least one of the steps of selecting an identifier material for confirming the identification of samples processed by a high-throughput analytical technique comprising selecting a compound that is distinct from the analyte of interest and optionally distinct from an internal standard used to assess quantitative recovery of the analyte, but that can be detected using the same analysis as the analyte.

D1. A computer-program product tangibly embodied in a non-transitory machine-readable storage medium, including instructions configured to run the system or any part of the system of any of the previous embodiments and/or perform a step or steps of any of the previous method embodiments.

D2. A computer-program product tangibly embodied in a non-transitory machine-readable storage medium, including instructions configured to cause one or more data processors to perform actions to direct at least one of the steps of confirming the identification of samples processed by a high-throughput analytical technique comprising:
distributing a plurality of individual samples to individual predetermined positions of a multi-sample test unit;
distributing an identifier material to at least one predetermined position of the multi-sample test unit;
determining the absence or presence of an analyte in the plurality of individual samples; and
determining the absence or presence of the identifier material, wherein the presence of the identifier material at the predetermined position of the multi-sample test unit is used to confirm the identity of the plurality of individual samples positioned in the multi-sample test unit.

D3. A computer-program product tangibly embodied in a non-transitory machine-readable storage medium, including instructions configured to cause one or more data processors to perform actions to direct at least one of the steps of selecting an identifier material for confirming the identification of samples processed by a high-throughput analytical technique comprising selecting a compound that is distinct from the analyte of interest and optionally distinct from an internal standard used to assess quantitative recovery of the analyte, but that can be detected using the same analysis as the analyte.

That which is claimed is:

1. A method for confirming identification of samples processed by a high-throughput analytical technique, comprising:
distributing a plurality of individual samples to individual predetermined positions of a multi-sample test unit;
distributing an identifier material to at least one predetermined position of the multi-sample test unit;
measuring, by mass spectrometry, an absence or presence of an analyte in the plurality of individual samples; and,
measuring, by mass spectrometry, the identifier material, wherein the measured identifier material at the predetermined position of the multi-sample test unit is used to confirm the identity of the plurality of individual samples positioned in the multi-sample test unit, and wherein the identifier material is selected from a compound that is distinct from the analyte and distinct from an internal standard used to assess quantitative recovery of the analyte, but wherein the compound can be detected using a same analysis as the analyte.

2. The method of claim 1, wherein the at least one predetermined position of the identifier material is distinct from any of the predetermined positions used for the samples.

3. The method of claim 1, wherein the predetermined position of the identifier material is different for different multi-sample test units.

4. The method of claim 1, wherein the multi-sample test unit is a 96-well plate.

5. The method of claim 1, wherein the identifier material has a different mass to charge (m/z) ratio than the analyte and the internal standard.

6. The method of claim 1, wherein the identifier material can be detected using the same mass spectrometry conditions as the analyte.

7. The method of claim 1, wherein the identifier material is positioned at a plurality of distinct predetermined positions in each multi-sample test unit.

8. The method of claim 1, wherein the identifier material is a different compound than an internal standard used to assess quantitative recovery of the analyte.

9. The method of claim 8, wherein the analyte is ethyl glucuronide/ethyl sulfate (ETG/ETS), the internal standard for ETG is penta-deuterated ETG (D5-ETG), the internal standard for ETS is penta-deuterated ETS (D5-ETS), and the identifier material is tri-deuterated (D3) dicarboxylic acid methylmalonate (MMA-D3).

10. The method of claim 1, wherein the identifier material is the same compound as an internal standard used to assess quantitative recovery of the analyte, but is labeled with a different isotope or a different number of isotopes.

11. The method of claim 10, wherein the analyte is 11-nor-9-carboxy-$\Delta^9$-tetrahydrocannabinol (THC-COOH), the internal standard is tri-deuterated (D3) THC-COOH, and the identifier material is nona-deuterated (D9) THC-COOH.

12. The method of claim 10, wherein the analyte is 6-monoacetylmorphine (6-MAM), the internal standard is tri-deuterated (D3) 6-MAM, and the identifier material is hexa-deuterated (D6) 6-MAM.

13. The method of claim 1, wherein a plurality of different analytes are analyzed simultaneously using a single identifier material.

14. The method of claim 13, wherein the analyte is at least two, or each of buprenorphine, norbuprenorphine, or naloxone, and the identifier material is (D6)-codeine.

15. A system for confirming identification of samples processed by a high-throughput analytical technique comprising:

a station or component configured to distribute a plurality of individual samples to individual predetermined positions of a multi-sample test unit;

a station or component configured to distribute an identifier material to at least one predetermined position of the multi-sample test unit;

a station or component configured to measure, by mass spectrometry, an absence or presence of an analyte in the plurality of individual samples; and, a station or component configured to measure, by mass spectrometry, the identifier material, wherein the measured identifier material at the predetermined position of the multi-sample test unit is used to confirm the identity of the plurality of individual samples positioned in the multi-sample test unit, and wherein the identifier material is selected from a compound that is distinct from the analyte and distinct from an internal standard used to assess quantitative recovery of the analyte, but that wherein the compound can be detected using a same analysis as the analyte.

* * * * *